United States Patent [19]

Murphy

[11] 4,308,532
[45] Dec. 29, 1981

[54] RASTER DISPLAY APPARATUS
[75] Inventor: Alan S. Murphy, Eastleigh, England
[73] Assignee: International Business Machines Corporation, Armonk, N.Y.
[21] Appl. No.: 99,804
[22] Filed: Dec. 3, 1979
[30] Foreign Application Priority Data

Dec. 20, 1978 [GB] United Kingdom ............... 49276/78

[51] Int. Cl.³ ............................................. G06F 3/153
[52] U.S. Cl. .................................. 340/723; 340/728; 340/750
[58] Field of Search ................ 340/728, 749, 750, 723
[56] References Cited

U.S. PATENT DOCUMENTS

| | | | |
|---|---|---|---|
| 3,553,676 | 1/1971 | Raciti | 340/750 |
| 3,737,890 | 6/1973 | Salava | 340/749 X |
| 3,903,517 | 9/1975 | Hafner | 340/723 X |
| 3,988,728 | 10/1976 | Inoue et al. | |
| 3,999,167 | 12/1976 | Ito et al. | 340/728 X |
| 4,081,799 | 3/1978 | Granberg et al. | 340/750 |
| 4,121,283 | 10/1978 | Walker | |
| 4,156,238 | 5/1979 | Glasson et al. | 340/749 |

FOREIGN PATENT DOCUMENTS

| | | |
|---|---|---|
| 2524303 | 12/1975 | Fed. Rep. of Germany . |
| 2620217 | 12/1976 | Fed. Rep. of Germany . |
| 1541919 | 3/1979 | United Kingdom . |

OTHER PUBLICATIONS

Jordan and Barrett; "A Cell Organized Raster Display for Line Drawings"; Communications of the ACM; vol. 17, No. 2, pp. 70-77, Feb. 1974.

IBM Systems "Reference Manual for IBM 5985 Color Display Control Unit, Model H02 and IBM 5941 Display Console Model H02," 3rd edition, Mar. 1975, 42 pages.

*Primary Examiner*—David L. Trafton
*Attorney, Agent, or Firm*—Frederick D. Poag

[57] ABSTRACT

A raster display apparatus capable of displaying graphic pictures includes a processor 13 for loading character codes (pointers) in a character buffer 12. The pointers address a character/cell generator 22 to derive the bit patterns necessary to refresh the display 1 under control of refresh logic 19. As the picture becomes increasingly complex, requiring more and more different character cells, the character/cell generator 22 fills. Space is created by combining two or more adjacent cells into a single low-resolution-displayed cell: an op code associated with each character code (pointer) determines whether the cell is to be displayed at full or reduced resolution and causes the refresh logic to clock bit patterns associated with low resolution cells at a slower rate. Optionally, the processor 13 changes low resolution parts of the picture to high resolution when an operator interacts with the low resolution part using a light pen 30.

15 Claims, 11 Drawing Figures

RASTER DISPLAY APPARATUS

FIELD OF THE INVENTION

The present invention relates to a raster display apparatus in which graphical images may be displayed on a raster display.

BACKGROUND OF THE INVENTION

Computer-driven display terminals using cathode ray tubes (CRT) can be categorized into the main types, the directed beam type in which the CRT beam is swept across the screen, and the raster-scan type in which the image is formed by raster-scanning the CRT beam across the screen. Typical directed beam displays are the IBM (Registered Trade Mark) 2250 and 3250 display terminals. The raster-scan type can be further subdivided into those employing a full bit-per-pel refresh buffer and those employing a character buffer and an associated character/cell generator.

The advantages and disadvantages (such as cost, degree and speed of interaction, etc) of these different types of displays are reviewed in the article entitled "A Cell Organized Raster Display For Line Drawings" by B. W. Jordan, Jr. and R. C. Barrett in Communications of the ACM, Volume 17, Number 2, February 1974 at pages 70 to 77. This article describes in some detail a raster scan display employing a character buffer and a character/cell generator in which a display can be built up from a number of characters or symbols. As indicated in the article, the more complicated the picture to be displayed, the more characters or symbols are required to build the picture and the larger the character/cell generator. The article describes an arrangement in which the size of the character/cell generator is limited by employing a set of patterns in a read only store of the character/cell generator and manipulating (by translation, reflection and masking) these patterns to derive other patterns. This has the disadvantage of complicating the refresh logic of the display.

SUMMARY OF THE INVENTION

An object of the present invention is to provide an improved raster display apparatus.

According to the present invention, a raster display apparatus comprises a cathode ray tube adapted to display a picture formed as a plurality of character cells, a refresh buffer adapted to contain a plurality of pointers one for each character cell position on said tube, a loadable character generator adapted to contain bit patterns representing character cells to be displayed, means adapted to load said refresh buffer with pointers determined by the content of a picture to be displayed and to load said character generator with bit patterns representing the character cells constituting said picture, and refresh logic means adapted to access said refresh buffer to read said pointers and to cause said readout pointers to access their associated bit patterns in said character generator for refreshing said tube, characterized in that said loading means is adapted to combine two or more adjacent character cells into a single character cell of lower resolution when said character generator is full, thereby to create additional space in said generator for the storage of further bit patterns and to associate with the or each pointer representing a low resolution cell an indication that said cell is of lower resolution.

The apparatus will normally display the picture at full resolution. However, when the picture becomes so complicated that the character cell generator is full, selected cells can be combined and displayed at lower resolution. The lower resolution part of the display may, optionally, be provided at the edge of the display if, in the particular graphics application, it is determined that the edge is less visually important than the center of the display.

Optionally, two or more levels of degradation can be provided. In the case of an interactive display where an operator wishes to interact with the display with, for example, a light pen, means may be provided for automatically reverting to full definition if the operator interacts with a degraded part of the picture. Alternatively, the operator could delete that part of the picture in which there is no interest, thereby releasing the character cell generator to provide full resolution for that part which is of interest.

BRIEF DESCRIPTION OF THE DRAWINGS

The invention will now be particularly described, by way of example, with reference to the accompanying drawings, in which.

DETAILED DESCRIPTION

Figure 1:
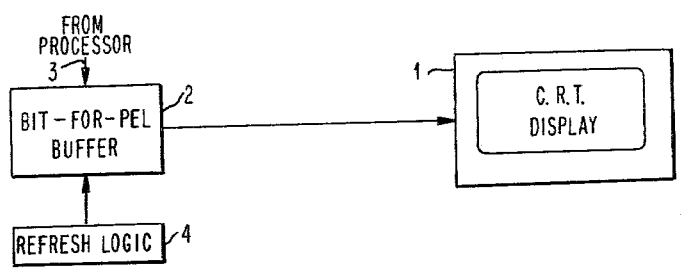
FIG. 1 is a schematic showing parts of the refresh portion of a graphics display employing a bit-per-pel refresh buffer.

Referring now to FIG. 1, a cathode ray tube display 1, which is to display a graphics image, is refreshed from a bit-per-pel buffer 2. The buffer 2 has a storage location for each displayable point on the CRT 1. Typically, therefore, the buffer may be from 1 to $4 \times 10^6$ bits in size depending upon the size and resolution of the CRT screen. Bits representing the image to be displayed are loaded into the buffer 2 from a processor, not shown, along line 3. Bits stored within the buffer 2 are sequentially read therefrom by refresh logic 4 during CRT refresh. Such an arrangement is perhaps the simplest form of graphics display because only simple logic is required for refresh. However, it does suffer from a requirement for a large refresh buffer.

Figure 2:
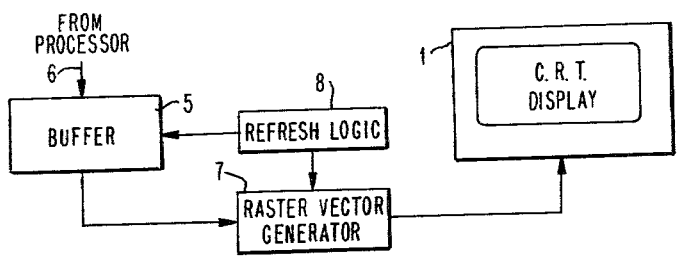
FIG. 2 is a schematic showing parts of the refresh portion of a graphics display employing a raster vector generator.

FIG. 2 shows an alternative form of raster display in which the bit-for-pel buffer of FIG. 1 is replaced by a somewhat smaller buffer 5 which can be loaded with coded vectors from a processor, not shown, on line 6. These vectors, coded for example in terms of their end points, or one end point and length and direction, are read into a raster vector generator 7 under control of the refresh logic 8. During each refresh cycle, the complete vector list within the buffer 5 must be read into the raster vector generator 7 which computes the bit pattern for each line of the raster display 1. This computation is done during the line flyback period. It will be apparent that such an arrangement requires very fast logic circuitry within the raster vector generator 7. It will also be appreciated that there will be some limit on the number of line crossings which can occur before flicker becomes a problem. The refresh logic 8 is also somewhat more complicated than the refresh logic 4 of FIG. 1.

Figure 3:
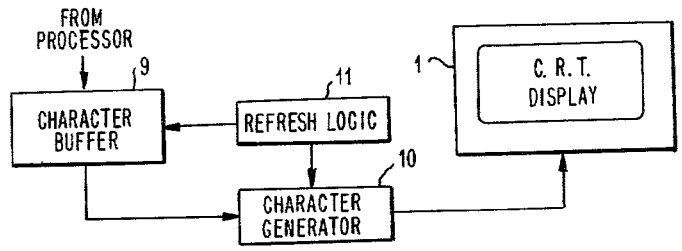
FIG. 3 is a schematic showing parts of the refresh portion of a graphics display employing a character/cell generator.

An intermediate approach is shown in FIG. 3 which is based on character displays such as the IBM (Registered Trade Mark) 3277, 3278, 3279 and 8775 display terminals. In such an arrangement, the picture on the CRT display 1 can be regarded as being composed from a matrix of character cells, each consisting of m×n displayable points. The character buffer 9 is sufficiently large to be able to store 1 character code (or pointer) for each character cell of the screen. The buffer can be a mapped buffer, as is the case of the aforementioned IBM 3277, 3278, 3279 and 8775 displays, or an unmapped buffer. In a mapped buffer, the characters are stored at positions within the buffer corresponding to the display position on the screen so that characters need only be read sequentially from the buffer during screen refresh. In an unmapped buffer, characters in the buffer are not stored at positions corresponding to their display positions but are stored with an address indicative of their position on the screen. The present invention is applicable to both types of character buffer although in the following description a mapped buffer will be assumed for descriptive purposes. In a mapped buffer arrangement, the refresh buffer 9 can be implemented as recirculating shift registers, as in the IBM 3277 display, or as a random access memory, as in the IBM 3278 and 8775 displays. An unmapped buffer will be in the form of a random access memory because accessing during refresh is not performed sequentially according to position.

A character/cell generator 10 contains bit patterns representative of the different characters which can be displayed. In alphanumeric character displays such as those mentioned above, the character/cell generator will be in the form of a read only store, but for character graphics, a read/write memory will normally be used. During refresh, the refresh logic 11 will read characters sequentially from the character buffer 9. The character codes from the buffer 9 act as pointers to the various bit patterns stored in the character/cell generator 10 which are sent to the CRT display 1. Not shown in FIG. 3 are the various buffers and serializers which those skilled in the art will appreciate are required to accommodate the differing accessing speeds and parallel to serial conversion requirements. Characters in the refresh or character buffer 9 are loaded therein from a processor, not shown. To create a graphics picture on the CRT display 1 rather than a purely alphanumeric display, codes representing the character cells will be stored in the buffer 9 and corresponding bit patterns will be stored in the character/cell generator 10.

Such an arrangement is quite satisfactory if the graphic display is at low resolution or for low-content pictures. However, as the picture becomes more complicated, or as the resolution is increased to minimize staircasing on lines on the screen which are not at 0°, 45° or 90° to the scan direction, the arrangement requires larger and larger character sets. The aforementioned article by Barrett and Jordan describes how the size of a read only store in the character/cell generator can be minimized by storing a basic set of character cells which can be manipulated to give a much larger set. As mentioned above, such an approach requires somewhat complicated and high speed refresh logic and may be limited by the requirement to store all basic cells even though many will not be used in any particular picture.

Figure 4:
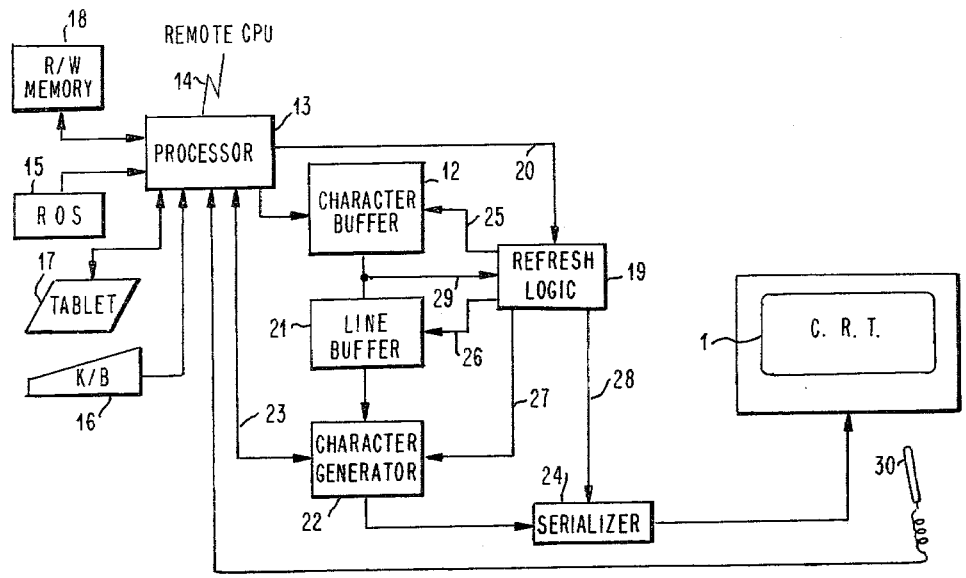
FIG. 4 is a block diagram illustrating a graphics display terminal embodying the present invention.

FIG. 4 illustrates a preferred embodiment of the invention. Picture information which is to be displayed on CRT display 1 is loaded into character buffer 12 from a local processor 13. The processor 13 can be a controller, such as the IBM 3272, 3276 controllers, a processor such as the IBM 8100, IBM system 32 or 38, or an internal microprocessor such as is used in the IBM 8775 display terminal. Its function will be further described below. Optionally, the local processor 13 is connectible to a remote central processing unit, not shown, by means of a communication link 14. Preferably the processor 13 operates under the control of microcode contained within a read only store 15. A keyboard 16 is connected to the processor 13 to allow the entry of alphanumeric data and command signals. A digitizing tablet 17 connected to the processor 13 allows the entry of digital data derived, for example, with a cursor or stylus from line drawings placed on the surface of the tablet. Other input/output devices, not shown, such as image scanners, printers and plotters can also be connected to the processor 13. The input/output devices will not be described in more detail since they do not, per se, constitute part of the present invention. Those skilled in the art will appreciate, however, that various interface devices will need to be interposed between the processor 13 and its attached devices.

Connected to the processor 13 is a read/write memory 18 which can be in the form of a random access memory, or a magnetic disc file, or a combination of random access memory and disc. The memory may contain, for example, character sets to be used, additional microcode for the control of the processor 13, and will normally be used during manipulation of data by the processor 13.

As indicated above, characters contained within the character buffer 12 are displayed on the CRT display 1 and the buffer 12 will therefore have sufficient capacity to store a code for each character cell position on the display 1. For present descriptive purposes it will be assumed to be a mapped buffer but as indicated above, an unmapped buffer could be used. To refresh the display, refresh control logic 19, operable under control of the processor 13 by means of control line 20, reads data to be displayed into a line buffer 21 which is used to build up each line of character cells on the display. The character codes in the line buffer 21 act as pointers to picture information stored within a character/cell generator 22 constituted by a random access memory. The bit patterns stored within the character/cell generator 22 are loaded therein on line 23 by the processor 13 in accordance with the picture to be displayed on the display. Normally the character/cell generator will contain bit patterns for all the standard alphanumeric characters and other symbols which are found on standard keyboards in addition to these characters or symbols which are used to build the required graphic picture. The bit patterns from the character/cell generator 22 are serialized in a serializer 24 for onward transmission to the video circuits in the display 1. Synchronization of the character buffer 12, line buffer 21, character/cell generator 22 and serializer 24 is maintained during refresh by means of control signals on lines 25, 26, 27 and 28 respectively. In a modification, not shown, a standard alphanumeric or symbolic character set can be stored in a separate read only store forming part of the character/cell generator 22 rather than in a random access memory.

Each pointer is stored in the character/buffer with an op. code which is indicative of the resolution at which the character cell with which it is associated is to be displayed. This op. code is sent via line 29 to the refresh control logic 19 to allow it to control clocking of the bit pattern to the display at a rate dependent upon the resolution.

A light pen 30 is connected to the processor 13 and allows an operator to interact with the display 1 in a conventional manner. Its use for changing the resolution of parts of the display will be described later.

Figure 5:
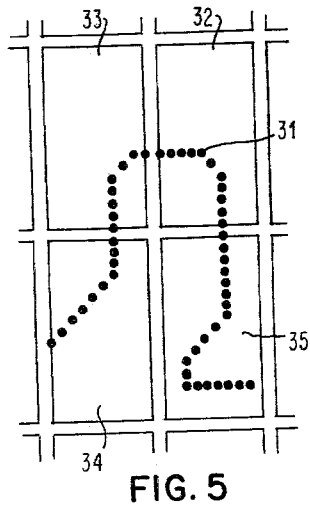
FIG. 5 shows how a curve formed from four character cells is displayed at full resolution.

FIG. 5 illustrates how a curve 31 can be built up on the screen of the CRT display using four character cells 32 to 35. In this example, each character cell is made up of a $9 \times 16$ matrix of pels (picture elements). Thus each cell requires 144 bits of storage in the character/cell generator 22, FIG. 4. If, for example, the character/cell generator has a storage capacity of 72K bits ($1K = 1024$), the bit patterns for some 512 different character cells could be stored in it. For simple pictures, this may well be a sufficiently large number. However, for more complicated pictures, there may not be sufficient space in the generator for all the required characters.

Figure 6:
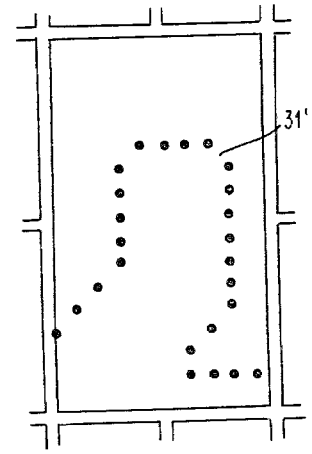
FIG. 6 shows the same curve formed at a lower resolution.

FIG. 6 shows how, by using the teachings of the present invention, space may be created in the character/cell generator for more bit patterns. In FIG. 6, a curve 31' of similar shape to curve 31, FIG. 5, is formed from a single character cell at a lower resolution than the curve 31. The character cell of FIG. 6 consists, for example, of $9 \times 16$ grels (graphic elements), each grel consisting of a $2 \times 2$ array of pels. The number of pels constituting a grel can be chosen to suit the particular application. As indicated above, an op. code is associated with each stored pointer to indicate the resolution at which that cell is to be displayed and this op. code is used by the refresh logic to adjust the clocking rate of the bit pattern from the character/cell generator to the display video circuits. The number of different levels of resolution will be $2^n$ where n is the number of bits in the op. code. Since only one $9 \times 16$ storage space is required in the character/cell generator to store the lower resolution cell, three spaces have been created in the character/cell generator for further bit patterns.

When the character/cell generator 22, FIG. 4, is filled with bit patterns representing normal resolution, the processor 13 automatically combines a group of character cells into a single lower-resolution cell to create space in the character/cell generator for further bit patterns. The pointers in the character buffer 12 will also be modified.

Figure 7:
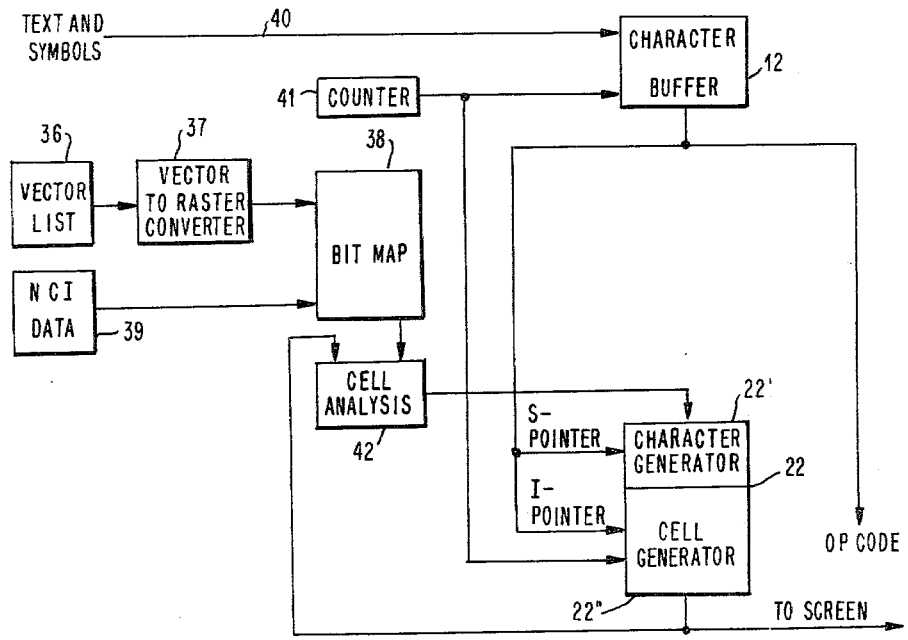
FIG. 7 shows the data flow employed in loading a character/cell generator.

When a particular picture is to be displayed on the screen, the processor 13, or alternatively the remote processor, generates a set of character/cell images and a set of pointers to these images. As indicated above, the pointers are stored in the character buffer 12 and the cell images in the character/cell generator 22. FIG. 7 shows the data flow employed in such a process. Cells which are empty or whose image is contained in a standard character set, for example, the alphanumeric characters, produce S-pointers to the standard character set contained in part 22' of character/cell generator 22. It will be appreciated that part 22' could be constituted by a read only store. Cells which are not part of the standard character set produce I-pointers to part 22' of the generator 22. There are two basic methods of operating. Firstly, a single cell image can be generated for each I-pointer. This means that duplicate images may exist in part 22' of the generator 22. Although this method will be less economical in terms of storage requirements, it does not require a search procedure or hashing algorithm and it, therefore, allows simple updating of the character/cell generator. In the alternative, a method that allows many I-pointers to select the same image will not generate duplicate images in the character/cell generator 22. Although this method is more economical in terms of storage requirement, it does require a search procedure and/or hashing algorithm during the update procedure. FIG. 7 shows the data flow for the first of these techniques while Table 1 below is a flow chart showing the second technique.

Referring now to FIG. 7, the processor 13, FIG. 4, receives a vector list 36 from the remote processor on line 14, FIG. 4, or from the keyboard 16 or tablet 17, FIG. 4. The vector list 36 defines vectors to be displayed on the screen in terms of their end-points. The vector list 36 is converted by the raster vector generator into a raster bit pattern which is loaded into bit map 38 constituted by read/write memory. Non-coded-information (NCI) data 39, for example from a scanner, can also be loaded into the bit map 38. It should be understood that the bit map 38 need not exist in entirety but can be a virtual bit map. If it is created by cell, then only one cell of the bit map need exist at any one instant in time. S-pointers to standard characters are loaded directly in the character buffer 12 along line 40.

Counter 41 is set to the first address of part 22'' of the character/cell generator 22 and the following procedure is executed, each cell of the bit map being examined as at 42 in turn:

(i) If empty proceed to the next cell.

(ii) Logically "OR" the cell image from bit map 38 with the cell image obtained, using the I-pointer in the equivalent character buffer position, from part 22'' of the generator 22.

(iii) Enter the resultant cell image in the generator 22 at the address given by the counter and place the counter value (the I-pointer) in the character buffer 12.

(iv) Increment the counter by 1.

(v) If not overflow, return to step 1.

If the counter 41 overflows the address range during updating of the character/cell generator from the bit map 38, then the picture content is too high and part of the picture will need to be degraded. Two or more adjacent cells in the bit map 38 are combined into one low definition image. The I-pointers are adjusted accordingly and one or more spare entries has been created in the cell generator 22 which can now be used to accommodate the picture content overflow.

After the character buffer 12 and character/cell generator 22 have been loaded as described, their contents can be used to refresh the picture on the screen.

As indicated above, more efficient use of the storage space in the character/cell generator 22 can be made if there is no duplication of cell images within it. To this end, Table 1 below is a flow chart in tabular form showing the process. Briefly, however, the procedure is similar to that described above with reference to FIG. 7 except that the counter is set from the output of a hash algorithm. After the cell images have been logically "ORed" together (step (ii) above), the resulting bit pattern is hashed into a 9-bit space which is used as the start point for the following search procedure:

(a) If the space in the character/cell generator is empty then use this address and place the cell image in this space. Proceed to the next cell.

(b) If the image matches the search bit-pattern then use this address. Proceed to the next cell.

(c) Proceed to the next address wrapping around to zero on address overflow.

(d) If not back at the start point then go to step (a).

If the address returns to the start point then an overflow has occurred. By combining 2 or more cells in the bit map, 1 or more spaces can be created in the character/cell generator 22.

TABLE 1

| Step | Comment |
|---|---|
| 1. | Enter routine and go to step 2. |
| 2. | Initialize to first cell and go to step 3. |
| 3. | Read cell image from bit map and go to step 4. |
| 4. | Determine if cell is empty, going to step 15 if it is and to step 5 if it is not. |
| 5. | Read cell image from character/cell generator, logically OR bit patterns together to create search pattern, and go to step 6. |
| 6. | Hash to 9-bit space and go to step 7. |
| 7. | Read cell image from character/cell generator as determined by result of step 6, and go to step 8. |
| 8. | Determine if cell image is empty, going to step 13 if it is and to step 9 if it is not. |
| 9. | Determine if cell image equals search pattern, going to step 14 if it is and to step 10 if it is not. |
| 10. | Increment address and go to step 11. |
| 11. | Determine if address is back to start, going to step 12 if it is and to step 7 if it is not. |
| 12. | Combine a number of image cells for display at low resolution to create some free pointers and space in character cell generator and go to step 13. |
| 13. | Write pattern in character/cell generator and go to step 14. |
| 14. | Write address pointer to character buffer and go to step 15. |
| 15. | Determine if this is last cell in bit map, going to step 17 if it is and to step 16 if it is not. |
| 16. | Move address to next cell and go to step 3. |
| 17. | Use pointers in character buffer and bit patterns in character/cell generator to display updated picture and go to step 18. |
| 18. | Exit routine. |

What has been described so far is a graphic display apparatus comprising a character buffer containing pointers to a character/cell generator which contains bit patterns for the various cells making up the picture. Associated with each pointer is an op. code which is indicative of whether that cell is to be displayed at full resolution or reduced resolution. Various aspects of the refresh circuits will now be described.

Figure 8:
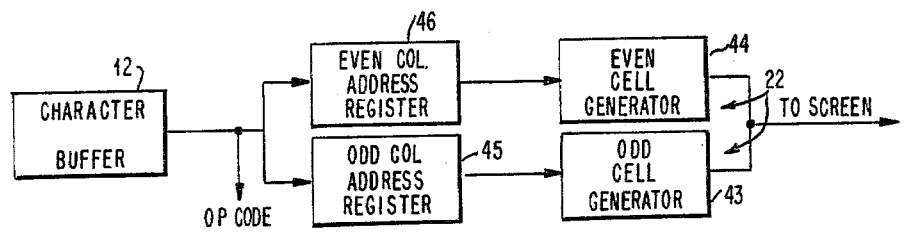
FIG. 8 shows one embodiment which may be used to clock picture information to the display in accordance with the resolution.
Figure 9:
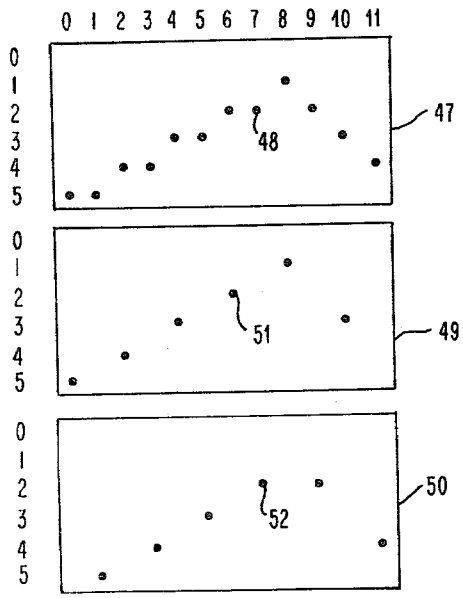
FIG. 9 shows how a character cell can be constituted by an odd cell and an even cell.

Suppose that the scan time for a raster line is 20 $\mu$sec and that the cycle time of the character/cell generator is 1 $\mu$sec, then there can only be 20 accesses to the generator for any one scan line. If 1024 pels are displayed per line, then each access must obtain at least 52 bits. For simple data flow, this implies a cell width of at least 52 bits, for example, a cell of 64 bits $\times$ 8 bits. Such a long thin cell shape is not convenient but can be decreased by partitioning the character/cell generator into a number of sections. Thus, referring to FIG 8, the character/cell generator 22 is shown partitioned into an odd cell partition 43 and an even cell partition 44. The bit patterns in partition 43 represent the cell images represented by pels in odd-numbered columns and the bit patterns in partition 44 represent pels in even-numbered columns. This form of partitioning is illustrated in FIG. 9 where an exemplary 12$\times$6 character cell 47 represents a curve 48. The cell 47 can be constituted by two cell partitions 49 and 50, the former representing the curve 51 formed from even-numbered columns and the latter representing the curve 52 formed from odd-numbered columns. Statistically, in any picture to be displayed, there will be approximately an equal number of pels in the odd and even columns. The partitions 43 and 44 of the character/cell generator 22 are separately addressable by means of address registers 45 and 46 respectively. By partitioning the character/cell generator in such a manner, the data bandwidth can be doubled if each partition is read simultaneously, thereby allowing the cell width to be reduced to 32 from 64 using the data rates mentioned above.

In the normal resolution mode, data from the character/cell generator partitions are sent to the screen sequentially, that is even-cell data followed by odd-cell data. In low definition display mode, indicated by means of the op. code, only one set of data, either the even cell or the odd cell is sent to the screen but at half speed. This concept of partitioning can be further applied. Thus, four partitions would allow the cell width to be reduced by a factor of 4.

Figure 10:
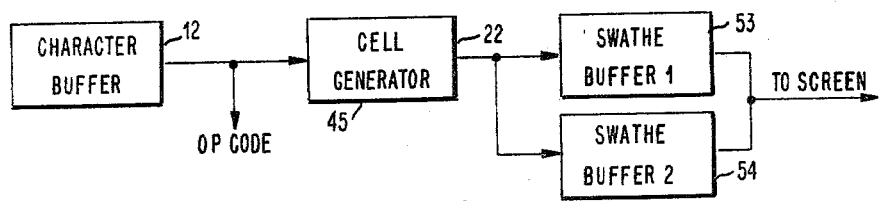
FIG. 10 shows an embodiment employing a pair of swathe buffers.

An alternative, and preferred, solution to the problem of matching the character/cell generator cycle time to the timing constraints imposed by the raster scan is to use a small store for reformatting the image data from the cell. To this end, a small swathe buffer capable of holding the data from one row of cells is placed between the character generator and the screen. Image data are loaded into this swathe buffer a cell at a time and are read out line by line. To avoid contention between input and output of the swathe buffer, it is advantageous to use a pair of swathe buffers as is shown in FIG. 10. Referring to FIG. 10, a line of cells, representing a swathe on the display on cell high, is read cell by cell from the character/cell generator 22 into swathe buffer 53. The assembled data are fed to the screen for refresh while the next swathe is assembled in swathe buffer 54. Because the swathe buffers 53 and 54 only perform a data format change and are unidirectional, they can be constructed from shift registers, equal in number to the number of lines in a cell and equal in size to the number of bits in a line.

The advantage of this arrangement is that timing constraints imposed by the CRT are separated from the timing of the character/cell generator whose characteristics can be selected independently of raster timing constraints. The data flow logic is effectively separated from the CRT driving logic so that complex interleaving or partitioning logic can be reduced. By using shift registers for the swathe buffer, expensive addressing logic can be avoided.

Figure 11:
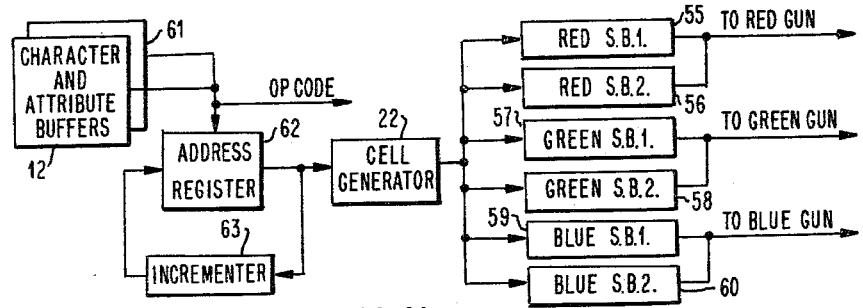
FIG. 11 is similar to FIG. 10, but is adapted to display color graphics.

FIG. 11 shows how the arrangement of FIG. 10 can be used with a color graphics display. In FIG. 11, a pair of swathe buffers 55 and 56 are associated with the red gun of the CRT, a pair of swathe buffers 57 and 58 are associated with the green gun of the CRT, and a pair of swathe buffers 59 and 60 are associated with the blue gun. Associated with each pointer contained within the character buffer 12 is an attribute byte contained within attribute buffer 61. The attribute byte determines, inter alia the color in which the associate cell is to be displayed and controls which swathe buffers are to be used.

Any bit pattern from the character/cell generator can be loaded into any swathe buffer and may be loaded in one, two or three simultaneously. Cells which contain a single color require a single bit pattern stored in the character/cell generator. Attribute bits are used to indicate which swathe buffer is to be loaded with this bit pattern. A cell which contains more than one color requires different bit patterns, one for each color, to be loaded into different swathe buffers. The different bit patterns are held sequentially in the character/cell generator 22 and can be selected by a single pointer from the character buffer 12. In the simplest, but general case, there are three sequential bit patterns, one for each of the three colors. The pointer is loaded into the address register 62 which causes the first bit pattern form the character/cell generator 22 to be loaded into the red swathe buffer 55. The address is incremented by incrementer 63 to cause the next bit pattern to be loaded into the green swathe buffer 57. Finally, the address is incremented again and the last bit pattern in the sequence is loaded into the blue swathe buffer 59. When each character or graphics cell in the first swathe has been loaded into the appropriate swathe buffer or buffers, this swathe is refreshed while the bit patterns for the next swathe are being assembled in the other swathe buffers.

In this embodiment, the op. code will contain a bit or bits indicative of the resolution at which the cell is to be displayed and bits indicative of the color. An advantage of the arrangement is that the character/cell generator is independent of color.

Returning now to FIG. 4, it was indicated that the light pen 30 allows the operator to interact with the picture on the screen 1. If the operator is interacting with a part of the picture which is displayed at low resolution, several possibilities exist. The simplest is for the picture to continue to be displayed at low resolution. However, interaction may be easier or more accurate if that part of the picture is displayed at full resolution. This can be done in two ways. Firstly, the operator can delete parts of the picture in which there is not interest to create extra space in the character/cell generator: the processor 13 would then reconfigure the character buffer 12 and character/cell generator 22 to display the part of interest at full resolution. Secondly, the operator could create space in the character/cell generator 22 by defining the part of the picture which is of less interest as to be displayed at low resolution. Thirdly, and preferably, the processor 13 could be arranged to recognize when a low resolution part is identified with the light pen 30 and automatically to display that part at full resolution and the other parts at reduced resolution.

What has been described is a raster display apparatus in which a picture to be displayed is built up using a character buffer containing pointers of equal number to the number of character cells on the display. The bit pattern associated with each character cell on the screen is contained with a loadable character/cell generator. Bit patterns are loaded into the character/cell generator by a processor at full resolution until the character/cell generator is full when space is created in the generator by redesignating two or more adjacent cells to be displayed at low resolution. This leads to a gradual degradation of the picture being displayed as its complexity increases.

Those skilled in the art will appreciate that the invention is particularly, but not exclusively, suitable for very high resolution displays, for example, displays having 4096×4096 beam addressable points.

While the invention has been particularly shown and described with reference to a preferred embodiment thereof, it will be understood by those skilled in the art that various changes in form and detail may be made therein without department from the spirit and scope of the invention.

Having thus described my invention, what I claim as new, and desire to secure by Letters Patent is:

1. A raster display apparatus comprising a cathode ray tube adapted to display a picture formed as a plurality of character cells,
   a refresh buffer adapted to contain a plurality of pointers one for each character cell position on said tube,
   a loadable character generator adapted to contain bit patterns representing character cells to be displayed,
   means adapted to load said refresh buffer with pointers determined by the content of a picture to be displayed and to load said character generator with bit patterns representing the character cells constituting said picture,
   and refresh logic means adapted to access said refresh buffer to read said pointers and to cause said readout pointers to access their associated bit patterns in said character generator for refreshing said tube,
   characterized in that said loading means is adapted to combine two or more adjacent character cells into a single character cell of lower resolution when said character generator is full thereby to create additional space in said generator for the storage of further bit patterns and to associate with the or each pointer respresenting a low resolution cell an indication that said cell is of lower resolution, said logic means being responsive to said indication to control clocking of the bit pattern for said lower resolution.

2. Apparatus as claimed in claim 1, characterized in that said refresh buffer has associated therewith an attribute buffer,
   each pointer in said refresh buffer having an attribute byte associated therewith stored in said attribute buffer,
   said attribute bytes containing data indicative of how their associated character cells are to be displayed including said indication of its resolution.

3. Apparatus as claimed in claim 1, characterized in that said indication is stored in said refresh buffer with the associated pointer.

4. Apparatus as claimed in any preceding claim, characterized in that said means is adapted during loading of said refresh buffer to search said character generator to determine whether a desired bit pattern associated with a particular character cell is already stored therein and to store a pointer to said existing desired bit pattern if it does exist and to store a pointer in said refresh buffer and said desired bit pattern in said generator if said desired bit pattern does not already exist.

5. Apparatus as claimed in any of claims 1 to 3, characterized in that said character generator further includes a read only store adapted to contain bit patterns representative of an alphanumeric or standard character set.

6. Apparatus as claimed in claim 4, characterized in that said character generator further includes a read only store adapted to contain bit patterns representative of an alphanumeric or standard character set.

7. Apparatus as claimed in any of claims 1 to 3, characterized in that said character generator is divided into a first portion containing character cell data corresponding to even-numbered columns and a second portion containing character cell data corresponding to odd-numbered columns, and in that said refresh logic is operable in response to an indication that a character cell is to be displayed at full resolution to transmit data from both portions and operable in response to an indication that a character cell is to be displayed at reduced resolution to transmit data from only one of said portions.

8. Apparatus as claimed in any of claims 1 to 3, characterized in that a swathe buffer capable of storing the bit patterns relating to a complete row of character cells to be displayed is provided to receive the output of said character generator.

9. Apparatus as claimed in claim 4, characterized in that a swathe buffer capable of storing the bit patterns relating to a complete row of character cells to be displayed is provided to receive the output of said character generator.

10. Apparatus as claimed in claim 5, characterized in that a swathe buffer capable of storing the bit patterns relating to a complete row of character cells to be displayed is provided to receive the output of said character generator.

11. Apparatus as claimed in claim 8, characterized in that a pair of said swathe buffers is provided, one being loaded with the bit patterns relating to one row of character cells as the bit patterns relating to the next row of character cells are being transmitted to the tube.

12. Apparatus as claimed in claim 7, characterized in that said cathode ray tube is a color tube having a plurality of primary-color channels, a swathe buffer or pair of swathe buffers being provided for each color channel and being connected to receive the output of a single character generator in which bit patterns representing the different primary colors to be displayed in a character cell are located in successive storage positions within said character generator.

13. Apparatus as claimed in claim 8, characterized in that said cathode ray tube is a color tube having a plurality of primary-color channels, a swathe buffer or pair of swathe buffers being provided for each color channel and being connected to receive the output of a single character generator in which bit patterns representing the different primary colors to be displayed in a character cell are located in successive storage positions within said character generator.

14. Apparatus as claimed in any of claims 1 to 3, characterized in that said loading means is adapted to respond to a signal indicating that part of the picture displayed at low resolution is of interest so as to combine two or more cells in another part of the picture so as to create space in said generator allowing said part of interest to be displayed at full resolution.

15. Apparatus as claimed in claim 7, characterized in that said loading means is adapted to respond to a signal indicating that part of the picture displayed at low resolution is of interest so as to combine two or more cells in another part of the picture so as to create space in said generator allowing said part of interest to be displayed at full resolution.

* * * * *